(12) United States Patent
Bryant, III

(10) Patent No.: US 6,578,851 B1
(45) Date of Patent: *Jun. 17, 2003

(54) GASKET ASSEMBLY FOR SEALING MATING SURFACES

(75) Inventor: Melvin A. Bryant, III, Decatur, AL (US)

(73) Assignee: The United States of America as represented by the National Aeronautics and Space Administration, Washington, DC (US)

(*) Notice: Subject to any disclaimer, the term of this patent is extended or adjusted under 35 U.S.C. 154(b) by 0 days.

This patent is subject to a terminal disclaimer.

(21) Appl. No.: 09/693,098

(22) Filed: Oct. 16, 2000

Related U.S. Application Data

(63) Continuation-in-part of application No. 09/160,205, filed on Sep. 21, 1998, now Pat. No. 6,142,483.

(51) Int. Cl.$^7$ ................................................ F16J 15/02
(52) U.S. Cl. ...................... 277/598; 277/609; 277/627; 277/630; 277/654; 277/919; 277/922; 277/930; 277/933; 277/940; 277/944
(58) Field of Search .................... 277/316, 592, 277/598, 609, 627, 630, 653, 654, 919, 922, 930, 933, 940, 944; 219/76.17, 78.01, 85.1, 544, 546, 547; 285/21.1, 21.2

(56) References Cited

U.S. PATENT DOCUMENTS

| | | | | |
|---|---|---|---|---|
| 3,897,087 A | * | 7/1975 | Neilson | 285/18 |
| 4,415,187 A | * | 11/1983 | Hudson, Jr. | 285/139.1 |
| 4,507,907 A | * | 4/1985 | Wolfson | 156/69 |
| 4,560,084 A | * | 12/1985 | Wolfson | 156/379.7 |
| 4,906,313 A | * | 3/1990 | Hill | 156/158 |
| 5,320,697 A | * | 6/1994 | Hegler et al. | 156/158 |
| 5,364,130 A | * | 11/1994 | Thalmann | 156/274.2 |
| 6,142,483 A | * | 11/2000 | Bryant, III | 277/598 |

FOREIGN PATENT DOCUMENTS

| | | | |
|---|---|---|---|
| DE | 2721340 | * | 11/1978 |
| DE | 2817243 | * | 10/1979 |
| DE | 0216998 | * | 1/1985 |
| JP | 0007016 | * | 1/1977 |
| JP | 405263983 | * | 10/1993 |
| SU | 0503069 | * | 2/1976 |

* cited by examiner

Primary Examiner—Anthony Knight
Assistant Examiner—Christopher Boswell
(74) Attorney, Agent, or Firm—James J. McGroary; George F. McGroary

(57) ABSTRACT

A pair of substantially opposed mating surfaces are joined to each other and sealed in place by means of an electrically-conductive member which is placed in proximity to the mating surfaces. The electrically-conductive member has at least one element secured thereto which is positioned to contact the mating surfaces, and which softens when the electrically-conductive member is heated by passing an electric current therethrough. The softened element conforms to the mating surfaces, and upon cooling of the softened element the mating surfaces are joined together in an effective seal. Of particular significance is an embodiment of the electrically-conductive member which is a gasket having an electrically-conductive gasket base and a pair of the elements secured to opposite sides of the gasket base. This embodiment is positioned between the opposed mating surfaces to be joined to each other. Also significant is an embodiment of the electrically-conductive member which is an electrically-conductive sleeve having an element secured to its inner surface. This embodiment surrounds cylindrical members the bases of which are the substantially opposed mating surfaces to be joined, and the element on the inner surface of the sleeve contacts the outer surfaces of the cylindrical members.

3 Claims, 2 Drawing Sheets

GASKET ASSEMBLY FOR SEALING MATING SURFACES

RELATED APPLICATIONS

This application is a continuation-in-part of application Ser. No. 09/160,205 filed Sep. 21, 1998 now U.S. Pat. No. 6,142,483 for Gasket Assembly For Sealing Mating Surfaces.

ORIGIN OF THE INVENTION

This invention was made by an employee of the United States Government and may be manufactured and used by or for the Government for governmental purposes without the payment of any royalties.

BACKGROUND OF THE INVENTION

1. Field of the Invention

This invention relates to gaskets.

2. Discussion of the Related Art

Gaskets are widely used to prevent leaks from joints. Frequently, gaskets deteriorate with age and at some point begin to leak. Also, some fluids corrode some gasket materials, resulting in leaks. Some gaskets, such as those used to seal rocker arm covers to automotive engines, tend to lose resiliency and shrink with age, allowing engine oil to leak out onto the engine. Some types of gaskets must be tightened periodically to avoid leaks. Welding a joint might be a method of achieving a joint which does not leak, even after the passage of time. However, welding a joint to prevent leaks is usually not feasible, since almost all joints have portions which are inaccessible.

SUMMARY OF THE INVENTION

In order to obviate the disadvantages of the art, a gasket assembly for sealing a pair of mating surfaces to each other is provided. One embodiment has an electrically-conductive gasket base having positioned on opposite sides thereof a pair of rings or layers of an element selected from the group consisting of fusible alloys, synthetic thermoplastic materials, and brazing alloys. The rings or layers, which are preferably made of a material which will wet the surfaces when melted, are attached to the gasket base by the use of a thermoplastic synthetic material, by a fusible alloy applied at points around the gasket base, or by some mechanical means. However, it is preferred that these layers be coated onto the gasket base. In use, this embodiment is positioned between two surfaces to be sealed to each other, and the surfaces are held in close contact with the gasket assembly. An electrical current is then passed through the gasket base to heat the gasket base and melt the layers, causing the surfaces to seal to opposite sides of the gasket base.

Another embodiment of the present invention is especially suitable for sealing a pair of mating surfaces which are the bases of cylindrical members such as solid rods or tubes, especially pipes. This embodiment is an electrically-conductive sleeve or tube which surrounds the cylindrical members whose bases are to be joined and contacts their outer surfaces. The electrically-conductive sleeve has an inner surface which is coated with an element selected from the group consisting of fusible alloys, synthetic thermoplastic materials, and brazing alloys. When melted, these elements wet the outer surfaces of the cylindrical members whose bases are to be joined. In use, this embodiment surrounds and contacts the outer surfaces of two cylindrical members whose bases are the mating surfaces which are to be joined. An electrical current is then passed through the electrically-conductive sleeve to heat the sleeve and melt the element coating the inner surface of the sleeve, thereby effectively joining the two cylindrical members to each other at their bases and sealing them in place upon cooling of the melted element.

DETAILED DESCRIPTION OF THE INVENTION

Figure 1:
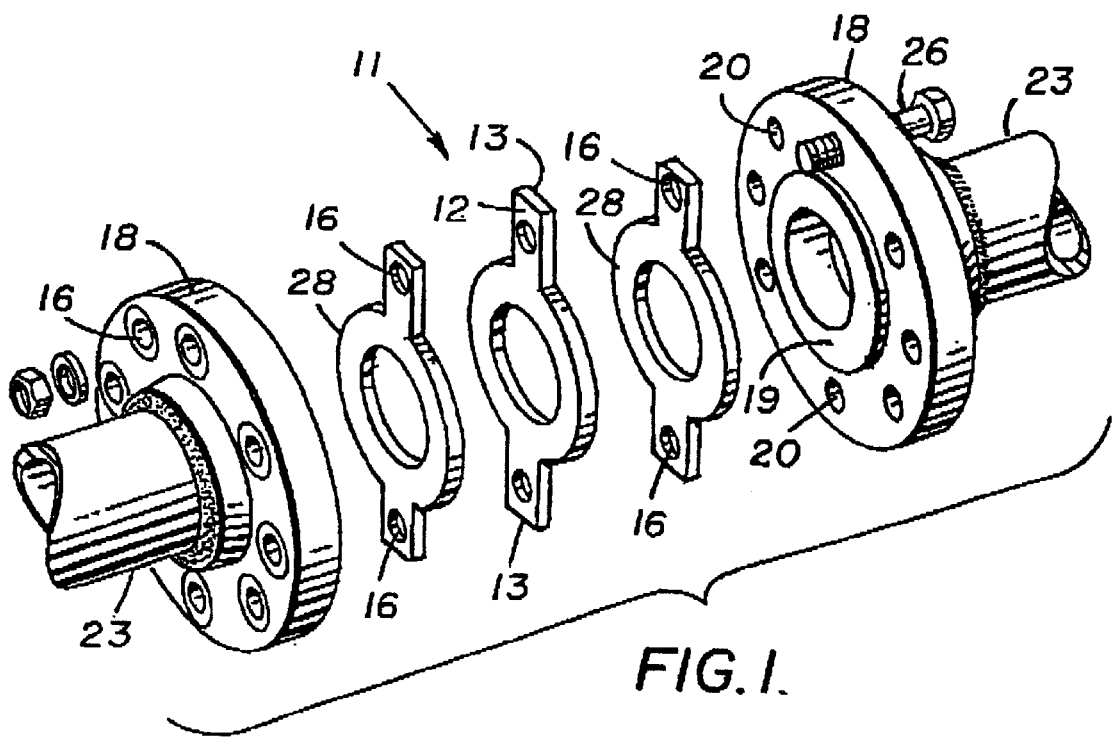
FIG. 1 is an exploded perspective view of an apparatus according to the present invention showing the arrangement of various parts making up one of the preferred embodiments of this invention.
Figure 2:
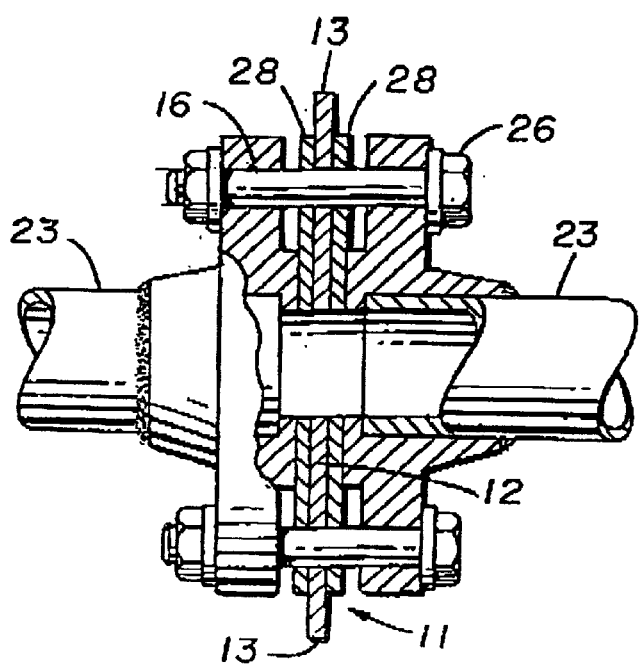
FIG. 2 is a cross sectional view of the apparatus of FIG. 1 showing the manner in which the gasket base in sandwiched between the sealing layers.

Referring now in detail to the drawings, there is shown in FIGS. 1 and 2 a gasket assembly 11 made up of a gasket base 12 having a pair of opposed tabs 13 which serve as electrical connections. The purpose of this gasket assembly is to seal a pair of surfaces 19 to each other, the surfaces in the embodiment shown being a part of flanges 18 secured to pipes 23 and having a plurality of bolt holes 20 arranged in a circle. In this embodiment, bolts 26 extend through the bolt holes 20 to secure the flanges 18 to each other with the gasket assembly sandwiched therebetween.

The gasket base 12 is preferably made of steel, most preferably mild steel, or some other electrically-conductive material which can be heated by passing an electric current through it. Positioned on opposite sides of the gasket base are rings or, preferably, layers 28 of a material which will melt and seal the flanges to the gasket base when the gasket base is heated by passing an electrical current through it. Preferably, the rings or layers 28 are in the form of thin films coated onto opposite sides of the gasket base.

While mild steel is the most preferred material for the gasket base 12 other materials can be used. The material used should have a sufficiently high electrical resistance that it is not necessary to pass unduly large currents of electricity through it to melt the layers 28. Also, the gasket base should not be so thick that an unduly large current is required to heat it sufficiently to melt the layers 28.

Some resistive materials other than steel are:

| Alloy | Composition % by weight | Ohms/circular mil-ft at 20° C. |
| --- | --- | --- |
| A | Cu: 55; Ni: 45 | 294 |
| B | Ni: 30; Cr: 5; Fe: 65 | 570 |
| C | Cu; Sn | 25 |
| D | Ni: 50; Fe: 50 | 120 |
| E | Ni: 95.5; Mn: 4.5 | 120 |
| F | Cu: 84; Mn: 12; Ni: 4 | 290 |
| G | Ni; Cu | 256 |
| H | Ni: 60; Fe: 25; Cr: 15 | 675 |
| I | Ni: 80; Cr: 20 | 650 |

In the preferred embodiment of FIG. 1 the ring 28 is shown as a thin layer of material to be secured to the gasket base. In FIG. 2, the ring 28 is shown as layers of solder adhered to opposite sides of the gasket base. The solder ring may also be attached to the gasket base by the use of a synthetic, thermoplastic material ("hot melt" adhesive, etc.) or by a fusible alloy applied at several points around the ring. However, it is preferable that the layer 28 adhered to the gasket base as a thin layer.

The ring or layer 28 may be made of a material selected from the group consisting of fusible alloys, synthetic thermoplastic materials and brazing alloys. Fusible alloys are those alloys which will melt at temperatures below about 250° C. Fusible alloys are usually binary, ternary, quaternary or quinary mixtures of bismuth, lead, tin, cadmium, indium and less frequently other metals. The term "low melting temperature" means a temperature below about 250° C. "Non-degradable" thermoplastic materials are those thermoplastic materials which will melt and which do not degrade when melted. For higher temperature applications the layers 28 may be brazing alloys. Brazing alloys are well known to those skilled in the art of brazing.

Some of the fusible alloys are:

| EUTECTIC ALLOYS | | | | | |
|---|---|---|---|---|---|
| Melting Temp. | Percentage Composition | | | | |
| ° C. | Bi | Pb | Sn | Cd | Other |
| 138.56[1] | 58 | 0 | 42 | 0 | 0 |
| 124.3[2] | 55.5 | 44.5 | 0 | 0 | 0 |
| 70.0[3] | 50 | 26.7 | 13.3 | 10 | 0 |
| 70.0[4] | 50 | 27 | 13 | 10 | 0 |
| 58.0[5] | 49 | 18 | 12 | 0 | In 2 |
| 46.9[6] | 44.7 | 22.6 | 8.3 | 5.3 | In 19.1 |

[1]Cerrotru;
[2]Cerrobase;
[3]Cerrobend;
[4]Lipowitz's metal;
[5]Cerrolow-136;
[6]Cerrolow-117

| NON-EUTECTIC ALLOYS | | | | | |
|---|---|---|---|---|---|
| Yield Temp. | Melt Range, | Percentage Composition | | | |
| ° C. | ° C. | Bi | Pb | Sn | Other |
| 159 | 145–176 | 12.6 | 47.5 | 39.9 | 0 |
| 142 | 120–152 | 21 | 42 | 37 | 0 |
| 135 | 129–132 | 5 | 32 | 45 | Cd 18 |
| 127 | 124–130 | 56 | 2 | 40.9 | In 0.4 Cd 0.7 |
| 116 | 103–227 | 48 | 28.5 | 14.5 | Sb 9 |
| 100 | 95–114 | 59.4 | 14.8 | 25.8 | 0 |
| 96 | 95–104 | 56 | 22 | 22 | 0 |
| 89 | 83–92 | 52 | 31.7 | 15.3 | Cd 1.0 |
| 72.5 | 70–90 | 42.5 | 37.7 | 11.3 | Cd 8.5 |
| 64.0 | 61–65 | 48 | 25.6 | 12.8 | Cd 9.6 In 4.0 |

| COMMON FUSIBLE ALLOYS | | | | | |
|---|---|---|---|---|---|
| Material | Approx. M.P. ° C. | Bi | Pb | Sn | Cd |
| Material A | 138.6 | 58 | 0 | 42 | 0 |
| Material B | 123.8 | 55.5 | 44.5 | 0 | 0 |
| Material C | 100 | 50 | 28 | 22 | 0 |
| Material D | 95 | 50 | 31 | 19 | 0 |
| Material F | 93 | 50 | 25 | 25 | 0 |
| Material F | 71 | 50 | 24 | 14 | 12 |
| Material G | 71 | 50 | 25 | 12.5 | 12.5 |
| Material H | 70 | 50 | 27 | 13 | 10 |
| Material I | 70 | 50 | 26.7 | 13.3 | 10 |

Synthetic thermoplastic materials usable in this invention are those materials which will melt, without degrading, at temperatures below about 250° C. and will wet the surfaces to be sealed to opposite sides of the gasket base. Such materials include hot melt adhesives, nylon, polyethylene and other plastics that are well known to those skilled in the art. It can readily be seen that the layers may be of different materials. For example, the layer 28 on one side of the gasket base may be a fusible alloy while the layer on the other side may be a synthetic, thermoplastic material. It is preferable that the layers on opposite sides of the gasket base melt at about the same temperature range.

An example of a high temperature application for this thermal seal is to braze-join lightweight components to each other using a mild steel gasket base about 60 mils thick coated with a braze alloy which melts at about 1,125° F. with a braze flux type B-1 (1,000–1,700° F.). This application is particularly suited to vacuum systems, catalytic converters and refrigeration systems.

There are many brazing alloys. Some of the most common are:

| | Composition | | | | | |
|---|---|---|---|---|---|---|
| | Cu | Ag | Zn | Cd | P | Melting Range, ° C. |
| Composition A | | | | | | |
| Composition B | 99+ | | | | | 1083 |
| Composition C | 50 | 50 | | | | 778–850 |
| Composition D | 15.5 | 50 | 16.5 | 18 | | 627–734 |
| Composition E | 93 | | | | 7 | 704–800 |
| Composition F | 28 | 72 | | | | 778 |
| Composition G | 34 | 50 | 16 | | | 695–775 |

Various brazing fluxes may be used with these brazing alloys. Those skilled in the art of brazing are familiar with brazing alloys and the brazing fluxes which will work best with each alloy. The brazing flux may be brushed onto the brazing alloy and protected by a thin layer of paper or plastic until the gasket is to be used, or the flux may be brushed onto the brazing alloy at the point of use.

It is preferred that the rings 28 be in the form of thin layers which have been applied to the gasket base 12 by coating the layer in molten form onto the gasket base (as by tinning). This allows for a maximum heat transfer from the gasket base 12 to the layers 28. Also, when the layers are so applied to the gasket base the exposed surfaces of the layers are smoother and flatter. This allows a maximum heat transfer from the gasket base through the layers to the surfaces 19 to be joined.

Preferably, there must be sufficient heat transferred through the layers 28 to heat the surfaces 19 to a temperature equal to or above the melting point of the layers 28. The gasket will work if the layers 28 are heated sufficiently to soften and conform to the surfaces 19 to be joined. However, it is much preferred that the layers 28 be heated to the melting point and that the layers wet the surfaces 19 when molten.

This joining process is more successful than others for the reason that the heat is applied directly to the surfaces 19 rather than to some other part of the flange or whatever the surfaces 19 are part of. Where the entire flange is heated to raise the temperature of the surfaces 19 up to the melting point of the layers 28, much more time and energy is required. Also, the joining is not completed until the surfaces 19 and the layers 28 are cooled at a temperature below the melting point of the layers 28. This means that the joint cannot be moved until this lower temperature is reached. In fact, the joint will, unless the flanges are clamped together by some mechanical means, probably be too hot to touch until it cools off. By using the process of this invention, some joints can be completed before the flanges 18 even get warm.

In operation, the gasket assembly is positioned between two surfaces to be secured together and a clamping force urges the surfaces 19 toward each other. The clamping force may be applied by a spring loaded clamp (not shown) or by the bolts 26. An electrical current is then passed through the gasket base to melt the layers on opposite sides of the gasket base. If bolts are used to hold the surfaces 19 together, the bolts are tightened while the layers 28 are in a molten state to urge the surfaces 19 toward the gasket base. If spring loaded clamps are used to urge the surfaces 19 toward each other it will not be necessary to use bolts. The electrical current is stopped and the layers 28 solidify and seal the surfaces to opposite sides of the gasket base. This, in effect, gives a welded joint without the problems which may be faced in attempting to actually weld the joint.

This gasket assembly is useful, for example, in the automotive industry for sealing the rocker arm covers to the head; for sealing the cylinder heads to the engine block and for sealing the thermostat housing to the head. It is also useful for sealing catalytic converter shells to each other. In this latter case, where the joint is to be subjected to high temperatures, the layers 28 are made of a braze alloy.

To separate the surfaces 19 after the gasket assembly has been installed, an electrical current is applied to the gasket base to heat it and melt the layers 28. The surfaces are then separated.

Figure 3:
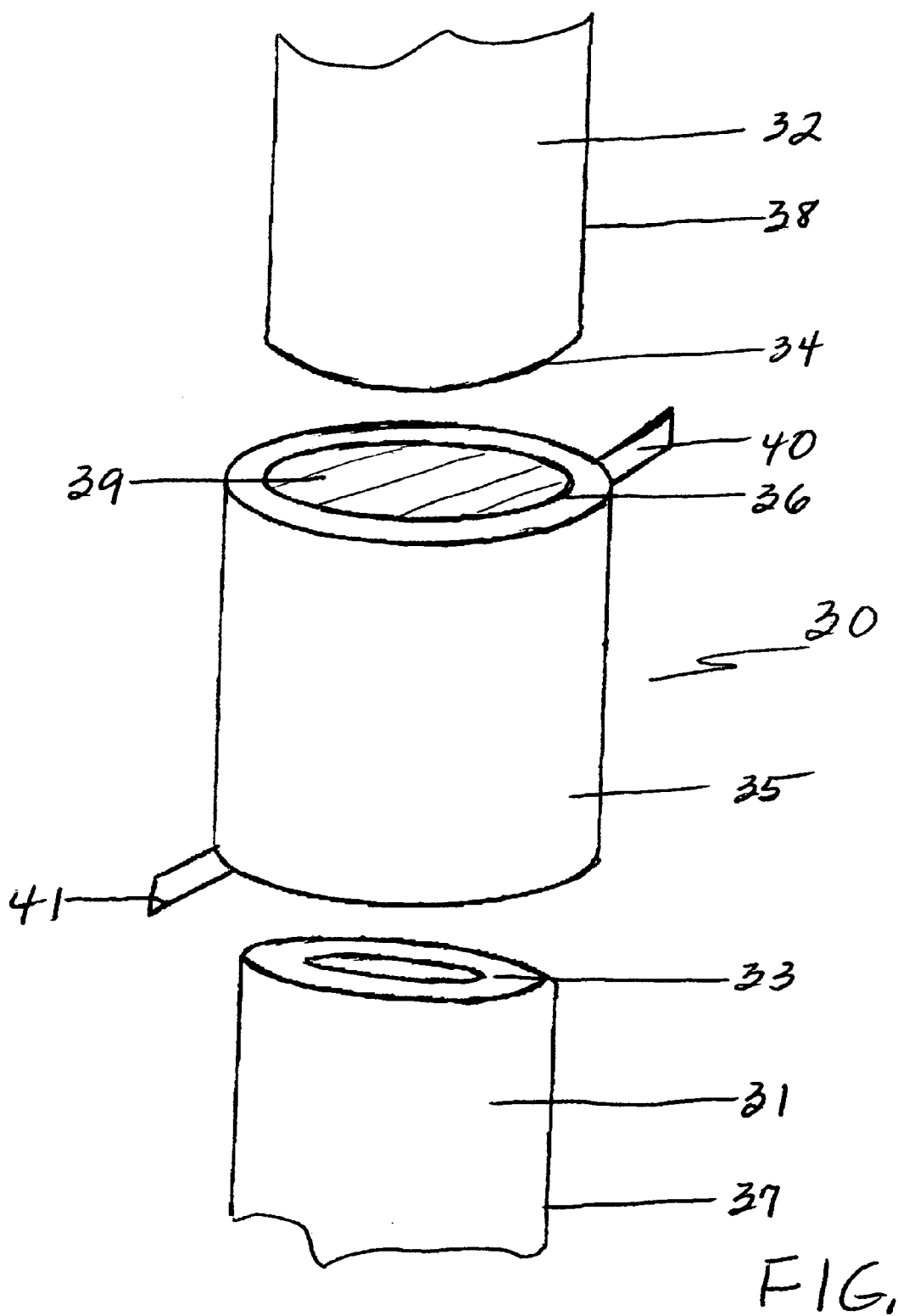
FIG. 3 is a schematic showing how another preferred embodiment according to the present invention is employed to join the bases of 2 tubular members and seal them in place.

Referring now to FIG. 3, another embodiment 30 of the present invention is shown, which is especially useful for joining bases 33 and 34 for cylindrical members 31 and 32 to each other and sealing them in place. Cylindrical members 31 and 32 are advantageously rods, or tubes as actually shown in the drawings. Conduits or pipes are particularly desirable as the cylindrical members. Embodiment 30 is an electrically-conductive sleeve, which includes tubular member 35 having inner circumference 36 large enough to receive cylindrical members 31 and 32. Cylindrical members are positioned within tubular member 35 so that their bases 33 and 34 respectively are in contact with each other. Outer surfaces 37 and 38 or cylindrical members 31 and 33 respectively are contacted by inner surface 39 of tubular member 35 along the lengths thereof. Tubular member 35 is made of any of the materials suitable for gasket base 12 of FIGS. 1 and 2, i.e., an electrically-conductive material which is heated by the passage of an electrical current therethrough. Inner surface 39 of tubular member 35 has adhered thereto a thin layer of a material suitable for layer(s) 28 of FIGS. 1 and 2, viz., an element selected from the group consisting of fusible alloys, synthetic thermoplastic materials, and brazing alloys. See discussion above concerning the materials suitable for layer(s) 28 and the means for attaching such layer(s) to the gasket base 13. Electrically-conductive sleeve 30 advantageously includes clamp pads 40 and 41 for connection to a source of electric current.

Cylindrical members 31 and 32 are inserted into tubular member 35 so that bases 33 and 34 respectively of cylindrical members 31 and 32 are in contact with each other. Outer surfaces 37 and 38 of cylindrical members 31 and 32 respectively are contacted by inner surface 39 of tubular member 35 along the lengths thereof. Clamp pads 40 and 41 are connected to a source of electric current, whereby tubular member 35 is heated, causing element 39 to melt and wet outer surfaces 37 and 38 of cylindrical members 31 and 32 respectively. Upon cooling of melted element 39, cylindrical members 31 and 32 are joined to each other at their bases 33 and 34 respectively and sealed in place. Disassembly of cylindrical members 31 and 32 is effected by passing an electric current through tubular member 35 so that tubular member 35 is heated and element 39 is melted. Cylindrical members 31 and 32 are then withdrawn from tubular member 35.

In employing any of the embodiments of the present invention, it has been found advantageous in some instances not to utilize a continuous flow of electrical energy into, e.g., gasket base 12 or tubular member 35. In such instances, a continuous flow of electrical energy, and the accompanying generation of heat, might result in undesirable heating of neighboring hardware and/or unnecessary consumption of electrical energy. In such instances, the application of electrical energy through impulses rather than continuously increases efficiency by reducing energy losses and heating time. Such an application of electrical energy is advantageously effected by discharging a capacitor into gasket base 12 or tubular member 35.

What is claimed is:

1. A gasket assembly for sealing a pair of mating surfaces to each other, comprising:

(a) a firm, generally flat electrically-conductive gasket base; and (b) a pair of elements secured to opposite sides of the gasket base, the elements having a melting temperature such that when the gasket assembly is positioned between the mating surfaces and an electric current is passed through the gasket base, the elements soften and melt, conforming to the mating surfaces and wetting the mating surfaces, thereby sealing the mating surfaces to opposite sides of the gasket base.

2. The gasket assembly of claim 1, wherein the gasket base is made from a material selected from the group consisting of steel, mild steel, tungsten, alloy A, alloy B, alloy C, alloy D, alloy E, alloy F, alloy G, alloy H, and alloy I.

3. The gasket assembly of claim 1, wherein the elements are made from a material selected from the group consisting of fusible alloys, brazing alloys, and synthetic thermoplastic materials.

* * * * *